United States Patent
Yuan (10) Patent No.: US 10,414,424 B2
(45) Date of Patent: Sep. 17, 2019

(54) STROLLER FRAME

(71) Applicant: Wonderland Switzerland AG, Steinhausen (CH)

(72) Inventor: Jia-Liang Yuan, Hong Kong (HK)

(73) Assignee: WONDERLAND SWITZERLAND AG, Steinhausen (CH)

( * ) Notice: Subject to any disclaimer, the term of this patent is extended or adjusted under 35 U.S.C. 154(b) by 29 days.

(21) Appl. No.: 15/801,079

(22) Filed: Nov. 1, 2017

(65) Prior Publication Data

US 2018/0141578 A1    May 24, 2018

(30) Foreign Application Priority Data

Nov. 18, 2016    (CN) .......................... 2016 1 1035371

(51) Int. Cl.
| | | |
|---|---|---|
| *B62B 7/08* | (2006.01) | |
| *B62B 7/04* | (2006.01) | |
| *B62B 9/20* | (2006.01) | |

(52) U.S. Cl.
CPC ................ *B62B 7/08* (2013.01); *B62B 7/044* (2013.01); *B62B 9/20* (2013.01)

(58) Field of Classification Search
CPC ........... B62B 7/008; B62B 7/044; B62B 7/08; B62B 5/064; B62B 7/06; B62B 7/10; B62B 7/14; B62B 7/142; B62B 9/12; B62B 9/28; B62B 9/24; B62B 9/20
USPC ...................... 280/650, 648, 47.38, 642, 647
See application file for complete search history.

(56) References Cited

U.S. PATENT DOCUMENTS

| | | | | |
|---|---|---|---|---|
| 8,205,894 B2* | 6/2012 | Li | ......................... | B60N 2/2848 |
| | | | | 280/47.38 |
| 8,668,222 B2* | 3/2014 | Chen | ........................ | B62B 7/08 |
| | | | | 280/47.38 |
| 8,740,243 B2* | 6/2014 | Li | .......................... | B62B 7/083 |
| | | | | 280/642 |
| 8,840,133 B2* | 9/2014 | Li | ............................. | B62B 7/10 |
| | | | | 280/650 |
| 8,936,267 B2* | 1/2015 | Li | ............................. | B62B 7/08 |
| | | | | 280/642 |
| 9,540,028 B2* | 1/2017 | Taylor | ....................... | B62B 7/10 |
| 9,545,940 B2* | 1/2017 | Taylor | ..................... | B62B 7/142 |
| 9,855,964 B2* | 1/2018 | Sack | ........................ | B62B 7/10 |
| 10,155,528 B2* | 12/2018 | Zhong | .................... | B62B 7/083 |
| 2016/0075363 A1* | 3/2016 | Gower | ................... | B62B 7/008 |
| | | | | 280/648 |

* cited by examiner

*Primary Examiner* — Paul N Dickson
*Assistant Examiner* — Hilary L Johns
(74) *Attorney, Agent, or Firm* — Hamre, Schumann, Mueller & Larson, P.C.

(57) ABSTRACT

A stroller frame includes two side frame units that are symmetrically arranged. Each of the side frame units includes a handle rod, a front leg, a rear leg rod, and a support rod. The front leg includes a first front leg rod connected pivotally to an end of the handle rod, and a second front leg rod connected pivotally to the first front leg rod and adapted to be connected fixedly to a seat member. The rear leg rod is connected pivotally to the handle rod. The support rod has an end connected pivotally to the rear leg rod, and an opposite end adapted to be connected pivotally to the seat member. The support rod is connected indirectly and pivotally to the second front leg rod.

12 Claims, 8 Drawing Sheets

STROLLER FRAME

CROSS-REFERENCE TO RELATED APPLICATION

This application claims priority of Chinese Patent Application No. 201611035371.9, filed on Nov. 18, 2016.

FIELD

This disclosure relates to a stroller frame, and more particularly to an easily collapsible stroller frame.

BACKGROUND

At present, strollers have been commonly used to carry a baby or child outdoor. In order to make strollers more portable and easy to store when not in use, conventional stroller frame has been designed to be collapsible to reduce its volume, by utilizing relatively complex mechanisms, which tend to be difficult and inconvenient to operate.

SUMMARY

Therefore, an object of the disclosure is to provide a stroller frame that can alleviate at least one of the drawbacks of the prior art.

According to the disclosure, the stroller frame has two side frame units that are symmetrically arranged. Each of the side frame units includes a handle rod, a front leg that includes a first front leg rod connected pivotally to an end of the handle rod, and a second front leg rod that is connected pivotally to the first front leg rod and that is adapted to be connected fixedly to a seat member, a rear leg rod that is connected pivotally to the handle rod, and a support rod that has an end connected pivotally to the rear leg rod, and an opposite end adapted to be connected to pivotally to the seat member. The support rod is connected indirectly and pivotally to the second front leg rod.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
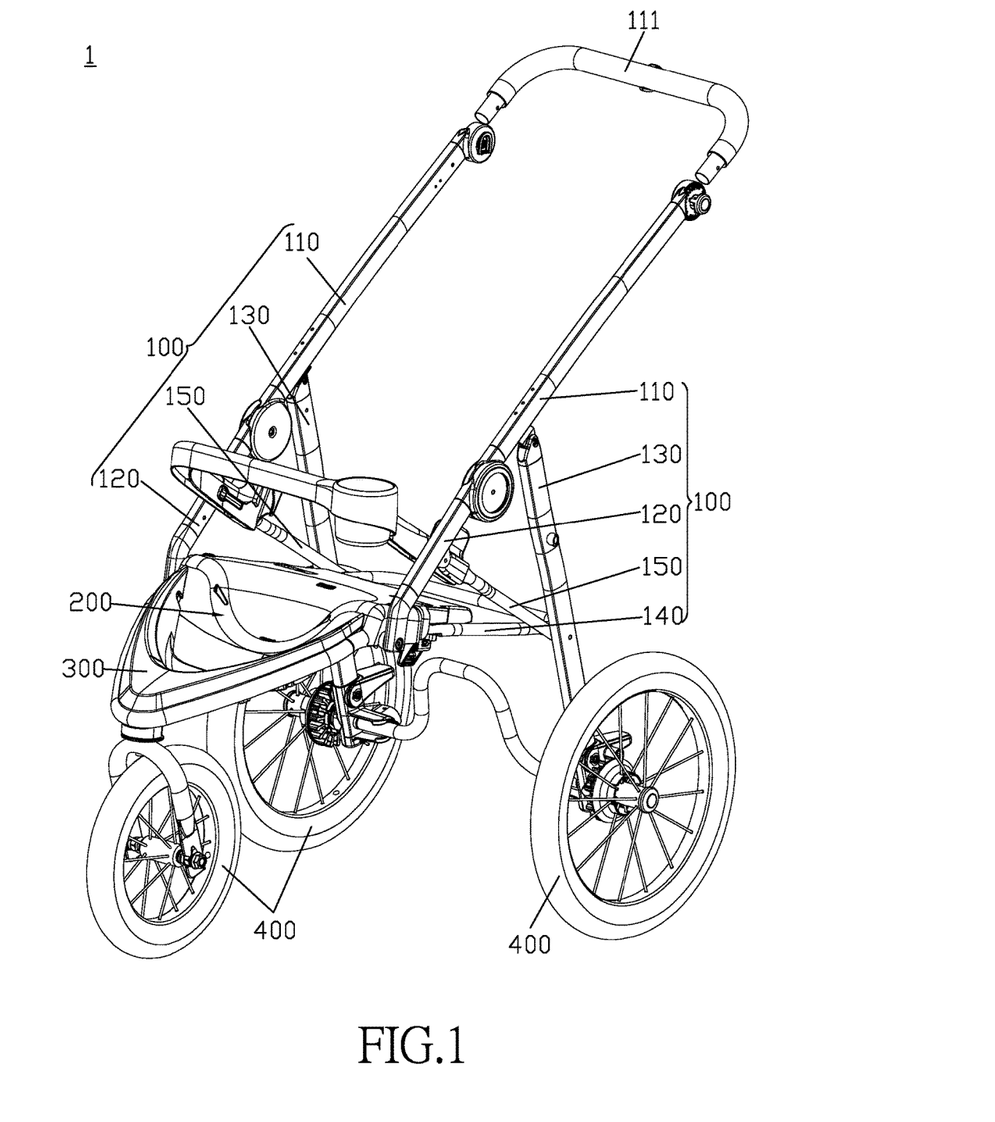
FIG. 1 is a perspective view of an embodiment of the stroller frame according to the disclosure which is in an unfolded state and which is mounted with a seat member and a footrest.

With reference to FIG. 1, an embodiment of a stroller frame 1 includes two side frame units 100 that are symmetrically arranged. The stroller frame 1 is adapted to be mounted with a seat member 200 and a footrest 300 that are connected between the two side frame units 100, and a plurality of wheels 400 that are rotatably connected to a bottom of the side frame units 100. Since the side frame units 100 are symmetrical, only one of the side frame units 100 will be described in detail hereinafter for the sake of brevity.

Figure 2:
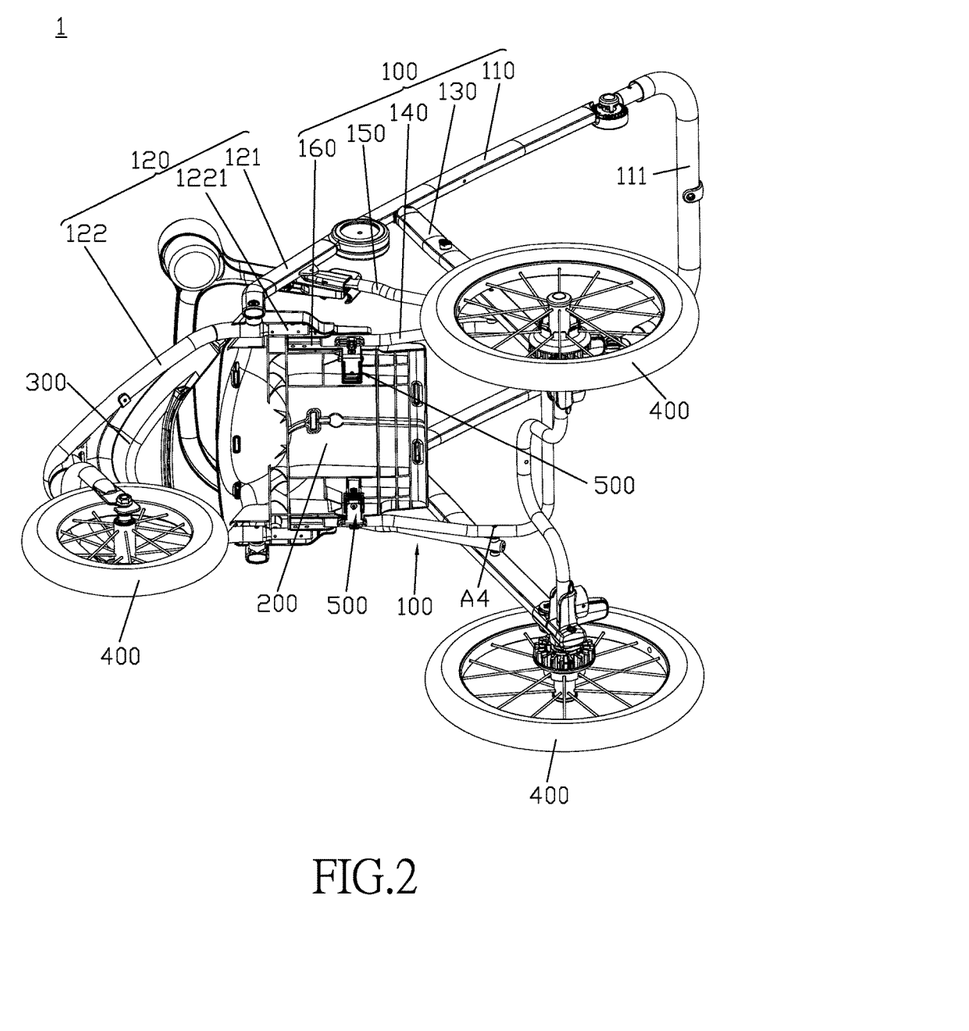
FIG. 2 is another perspective view of the embodiment.
Figure 3:
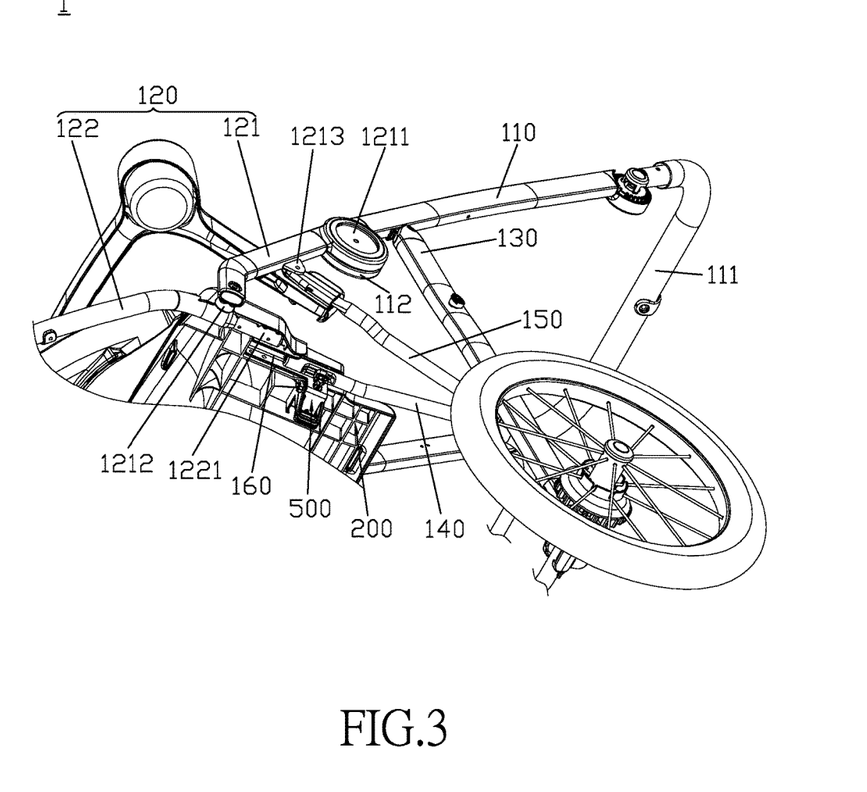
FIG. 3 is a fragmentary perspective view of FIG. 2.

Referring to FIGS. 1 to 3, the side frame unit 100 includes a handle rod 110, a front leg 120, a rear leg rod 130, a support rod 140 and a side rod 150. Each of the front leg 120 and the rear leg rod 130 has an upper end that is pivotally connected to a lower end of the handle rod 110, and a lower end that is opposite to the upper end. Specifically, the lower end of the front leg 120 is adapted to be connected fixedly to the seat member 200. The support rod 140 has an end connected pivotally to the rear leg rod 130, and an opposite end adapted to be connected pivotally to the seat member 200 and connected indirectly and pivotally to the lower end the front leg 120. The side rod 150 has an end connected pivotally to the front leg 120, and an opposite end connected pivotally to the rear leg rod 130. A pivot intersection of the end of the side rod 150 and the front leg 120 is adapted to be higher than the seat member 200. In this embodiment, the rear leg rod 130, the opposite end of the side rod 150, and the end of the support rod 140 interconnect with one another at a single intersection.

With particular reference to FIG. 1, the stroller frame 1 also includes a substantially U-shaped handle grip 111 that has opposite ends respectively connected to distal ends (i.e., upper ends) of the handle rods 110 of the side frame units 100 which are opposite to the front legs 120 of the side frame units. It is understood by those skilled in the art that the structure and shape of the handle rod 110 may be altered and are not limited to such.

Further referring to FIGS. 2 and 3, the front leg 120 includes a first front leg rod 121 and a second front leg rod 122. The first front leg rod 121 has an upper end that serves as the distal end of the handle rod 110, and that is connected pivotally to one of the opposite ends of the handle grip 111 of the handle rod 110. The second front leg rod 122 has a lower end that serves as the lower end of the front leg 120, and an upper bent end section 1221 that is connected pivotally to an lower end of the first front leg rod 121, and that is adapted to be connected fixedly to the seat member 200, such that the seat member 200 is rotatable during pivot action of the second front leg rod 122 relative to the first front leg rod 121.

Although the upper bent end section 1221 is exemplified in this embodiment as a portion of the single-piece second front leg rod 122, the second front leg rod 122 may be formed in other embodiments by two independent rod parts coupled together with an obtuse angle being formed therebetween.

Figure 4:
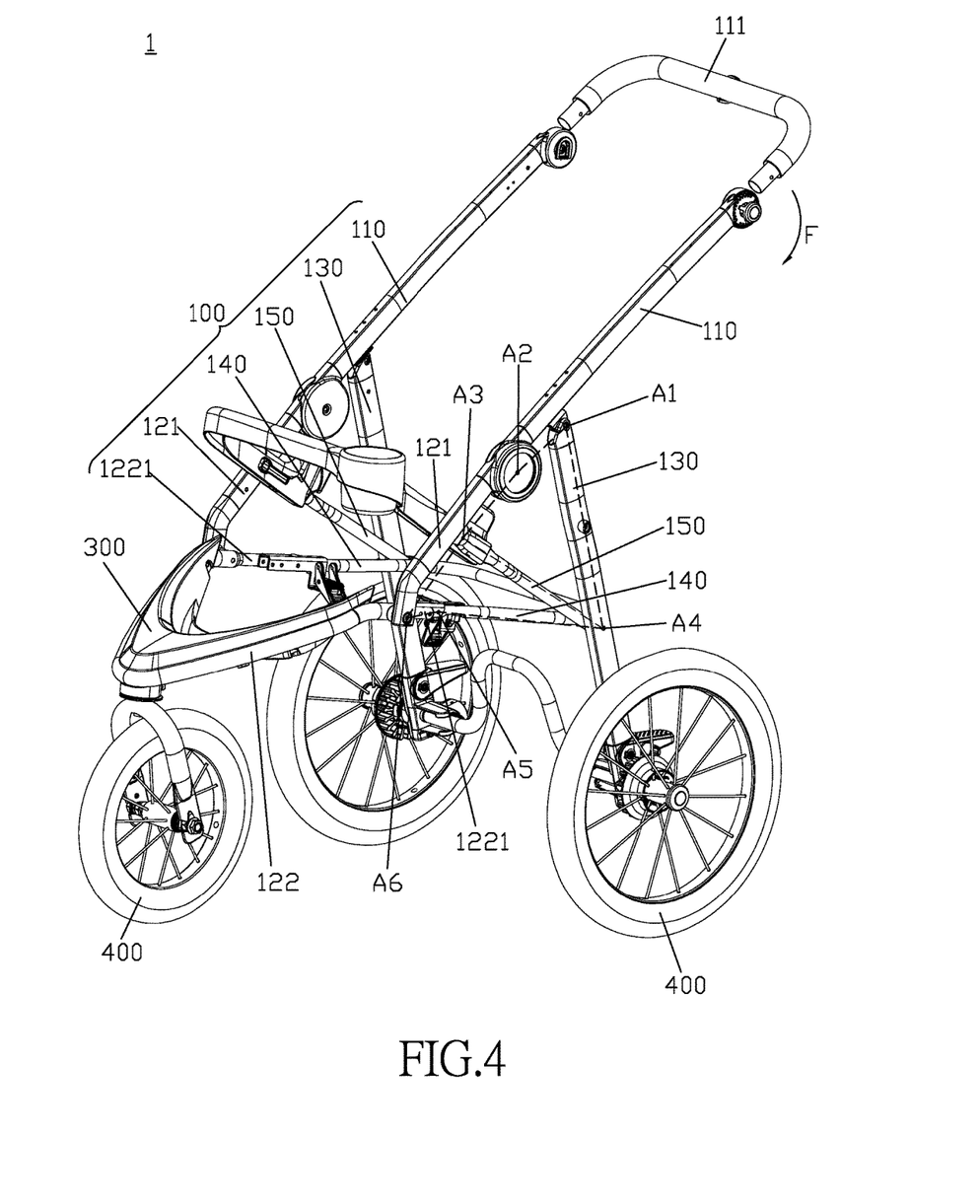
FIG. 4 is a view similar to FIG. 1 with the seat member being removed.

Referring to FIG. 4, the handle rod 110, the first front leg rod 121, the side rod 150 and the rear leg rod 130 cooperatively form a first four-bar linkage mechanism, and the first front leg rod 121, the second front leg rod 122, the support rod 140, and the side rod 150 cooperatively form a second four-bar linkage mechanism. By virtue of the first and second four-bar linkage mechanisms, the stroller frame 1 is operable between a folded state (see FIG. 8) and an unfold state (see FIG. 4).

Referring back to FIGS. 2 and 3, in this embodiment, each of the side frame units 100 further includes a securing member 160 that is adapted to be connected fixedly to the bottom of the seat member 200, and that has an end secured to the upper bent end section 1221 of the second front leg rod 122, and an opposite end connected pivotally to the opposite end of the support rod 140 (i.e., the support rod 140 is not directly connected to the second front leg rod 122).

In this embodiment, the securing member 160 is made of a metal plate, but the material of the securing member 160 may vary in other embodiments.

In this embodiment, the stroller frame 1 further includes two lock mechanisms 500, each of which is adapted to be connected between the seat member 200 and the opposite end of the support rod 140 of a respective one of the side frame units 100 for locking the relative position between seat member 200 and the support rods 140 of the side frame units 100. When the lock mechanism 500 is unlocked, the stroller frame may be freely folded. Since the configuration of the lock mechanisms 500 is known in the art, further details of the same are omitted for the sake of brevity.

As shown in FIG. 3, each of the side frame units 100 further includes a first pivot joint 112 that is fixedly mounted to the lower end of the handle rod 110, and a second pivot joint 1211 that is fixedly mounted to the upper end of the first front leg rod 121. The first and second joints 112, 1211 are buckled to form the pivot connection between the handle rod 110 and the first front leg rod 121. Each of the side frame units 100 further includes a pivot seat 1212 protruding from the lower end of the first front leg rod 121 to the upper bent end section 1221 of the second front leg rod 122 to form the pivot between the first and second front leg rods 121, 122. The first front leg rod 121 includes a pivot lug 1213 that is connected pivotally to the side rod 150.

Referring once again to FIGS. 1 and 2, the lower ends of the second front leg rods 122 of both side frame units 100 are connected to each other, and the second front leg rods 122 of the side frame units 100 are adapted for cooperatively supporting the footrest 300 therebetween. Specifically, the second front leg rods 122 of both side frame units 100 are molded as one piece and are connected through their lower ends to collectively form a V-shaped structure.

Referring further to FIG. 4, the ends of the support rods 140 of the side frame units 100 distal to the seat member 200 are connected to each other. In this embodiment, the support rods 140 of the side frame units 100 are molded as one piece and are connected to collectively form a U-shaped structure.

Figure 5:
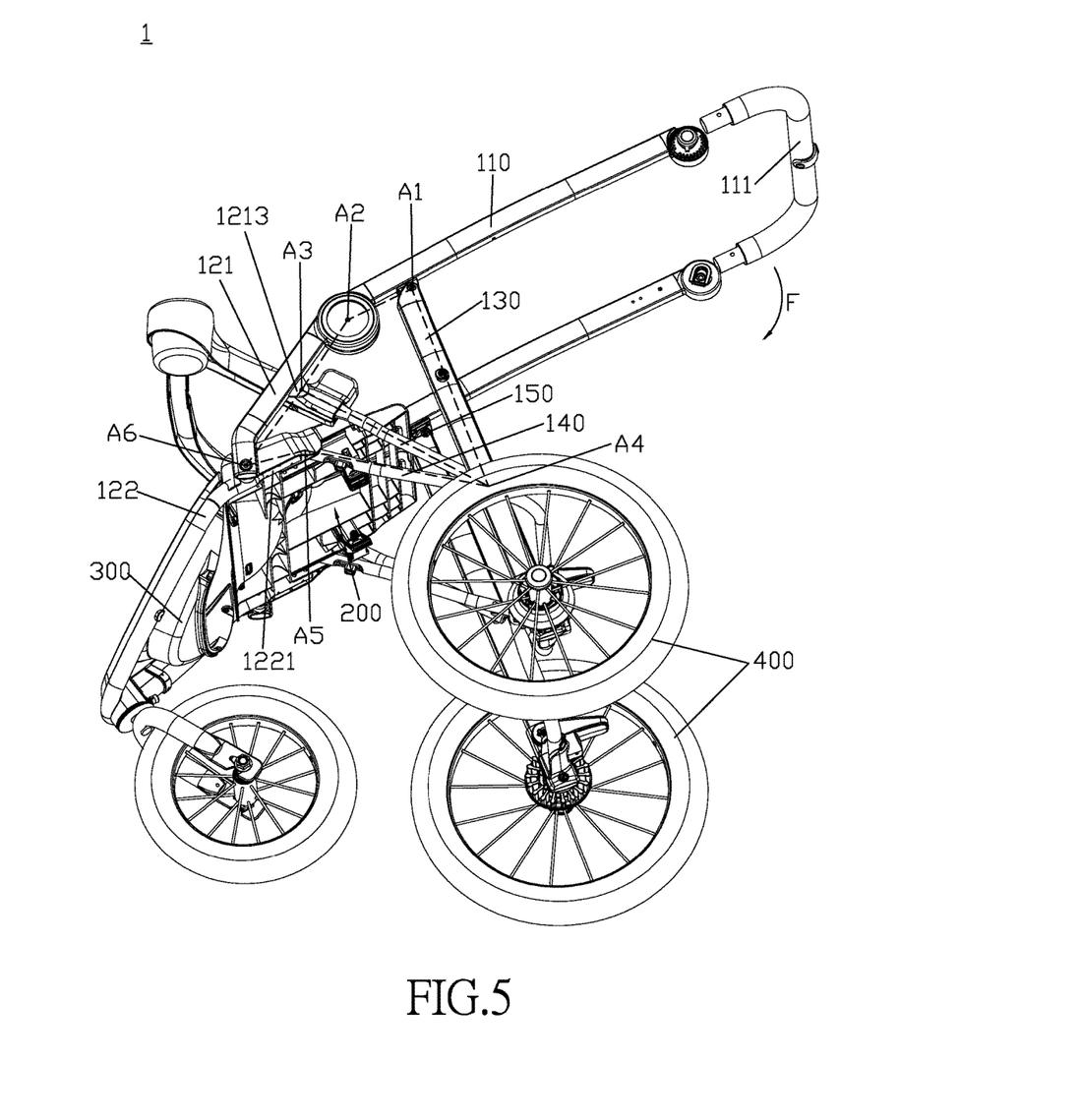
FIGS. 5 through 7 are perspective views illustrating a folding process of the embodiment.

Referring to FIGS. 4 and 5, in this embodiment, for each of the side frame units 100, the handle rod 110 and the rear leg rod 130 interconnect with each other at a first pivot intersection (A1), the first front leg rod 121 of the front leg 120 and the lower end of the handle rod 110 interconnect with each other at a second pivot intersection (A2), the end of the side rod 150 and the pivot lug 1213 of first front leg rod 121 interconnect with each other at a third pivot intersection (A3), and the opposite end of the side rod 150 and the rear leg rod 130 interconnect with each other at a fourth pivot intersection (A4). The handle rod 110, the first front leg rod 121, the side rod 150, and the rear leg rod 130 cooperatively form a first four-bar linkage mechanism having the first, second, third and fourth pivot intersections (A1,A2,A3,A4).

Similarly, for each of the side frame units 100, the end of the support rod 140 and the rear leg rod 130 interconnect with each other at the fourth pivot intersection (A4), the opposite end of the support rod 140 is adapted to be connected pivotally to the seat member 200 at a fifth pivot intersection (A5), and the first and second leg rods 121, 122 interconnect with each other at a sixth pivot intersection (A6). The first front leg rod 121, the second front leg rod 122, the support rod 140, and the side rod 150 cooperatively form a second four-bar linkage mechanism having the third, fourth, fifth, and sixth pivot intersections (A3, A4, A5, A6).

With the aforementioned pivot intersections predefined, the folding process of the stroller frame 1 revolves around the following procedure illustrated by FIGS. 1 through 8:

Referring to FIGS. 1 to 4, when the stroller frame 1 is in the unfolded state, a front end of the seat member 200 is supported by the upper bent end sections 1221 of the second front leg rods 122 of the side frame units 100, and the support rods 140 of the side frame units 100 extend substantially horizontally and support a rear end of the seat member 200. The lock mechanism 500 locks the seat member 200 onto the support rods 140. At this time, the first pivot intersection (A1) is higher than the second pivot intersection (A2). The lock mechanism 500 is required to be unlocked when attempting to fold the stroller frame 1.

For each of the side frame units 100, after the lock mechanism 500 is unlocked, by pushing the handle grip 111 downwardly in a direction (F) as illustrated in FIG. 4, the handle rod 110 is driven to pivot downwardly about the first pivot intersection (A1), thereby lifting the front leg 120 and resulting in downward pivot movement of the first front leg rod 121 about the second pivot intersection (A2). Simultaneously, the side rod 150 pivots relative to the first front leg rod 121 about the third pivot intersection (A3), and also pivots relative to the rear leg rod 130 about the fourth pivot intersection (A4), thereby turning the first four-bar linkage mechanism to a state as shown in FIG. 5.

During the abovementioned conversion of the stroller frame 1, for each of the side frame units 100, the second front leg rod 122 is moved upwardly along with the first front leg rod 121, and pivots downwardly relative to the first front leg rod 121 about the sixth pivot intersection (A6). Meanwhile, the seat member 200, which is connected to the upper bent end section 1221 of the second front leg rod 122, is driven to rotate, thereby lifting the opposite end of the support rod 140. The support rod 140 pivots relative to the seat member 200 about the fifth pivot intersection (A5), and also pivots relative to the rear leg rod 130 about the fourth pivot intersection (A4), thereby turning the second four-bar linkage mechanism to a state as shown in FIG. 5.

Figure 6:
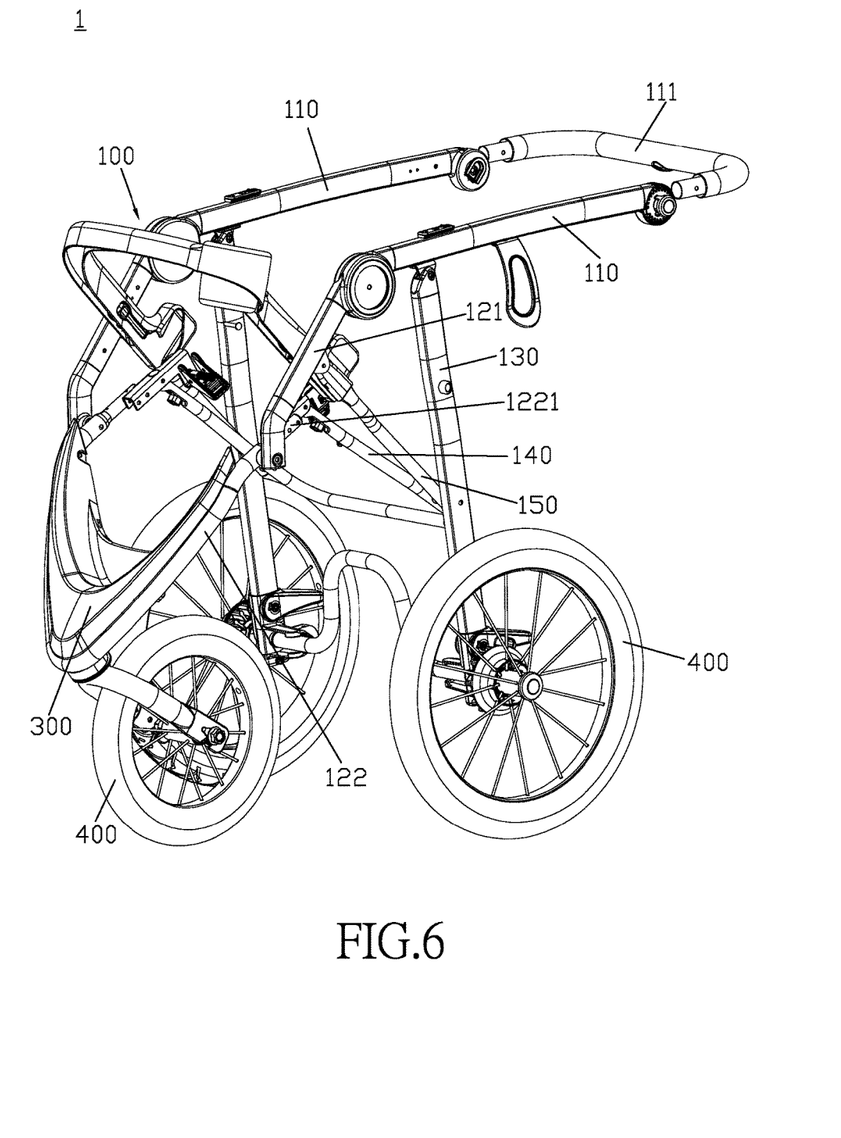
Figure 7:
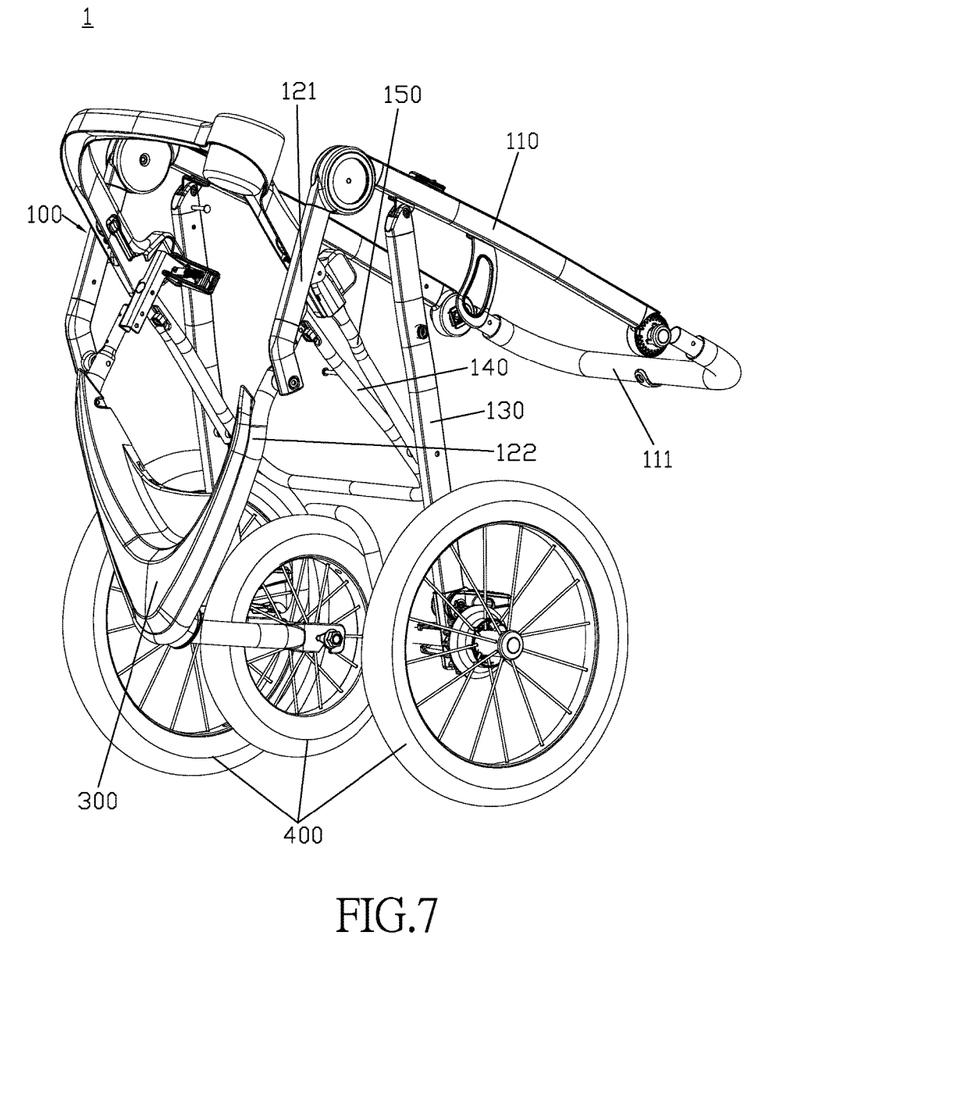
Figure 8:
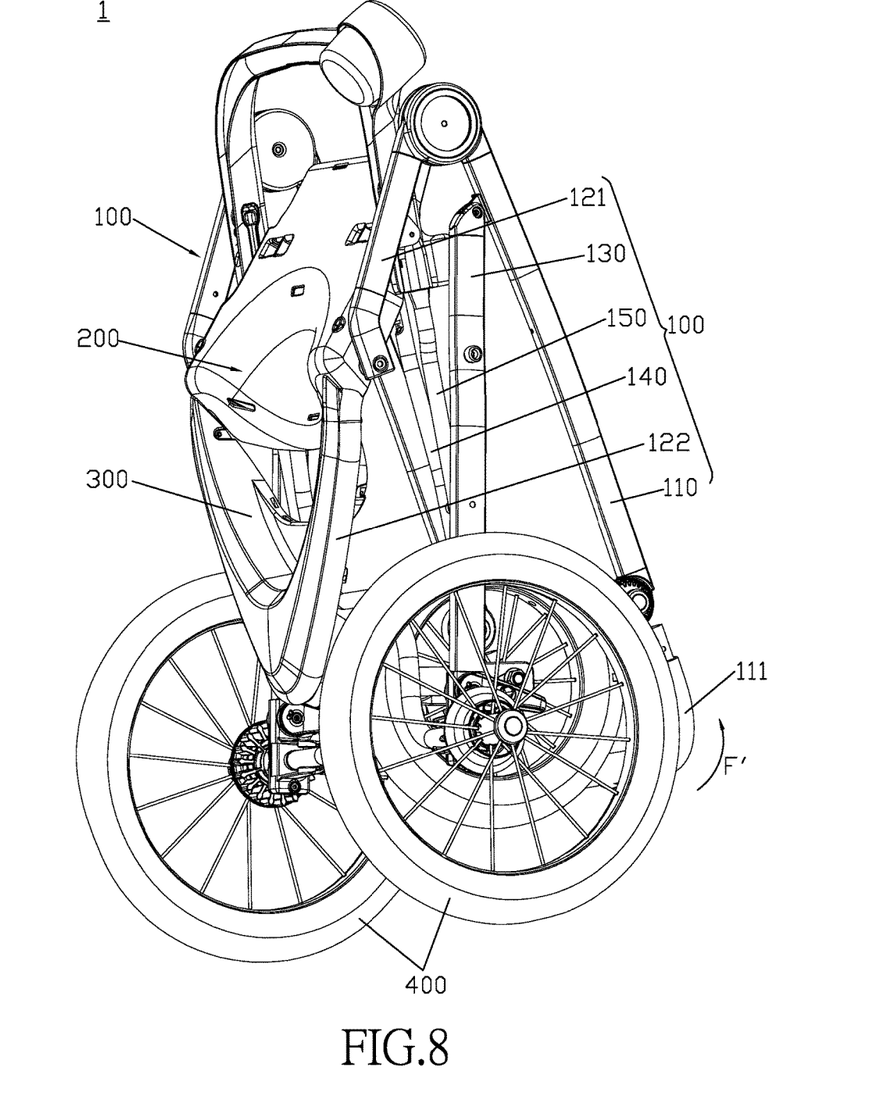
FIG. 8 is a perspective view of the embodiment in a folded state.

When the handle grip 111 is further pushed in the direction (F), for each of the side frame units 100, as shown in FIGS. 6 and 7, the handle rod 110 further pivots closer to the rear leg rod 130, and the front leg 120 is brought closer to the rear leg rod 130. Eventually, the stroller frame 1 reaches the folded state, as shown in FIG. 8, where the handle grip 111 is proximate to the bottom end of the rear leg rod 130, the front leg 120 is brought to be proximate to and be substantially parallel to the rear leg rod 130, and the seat member 200 is rotated to a substantially vertical position.

Conversely, when the handle grip 111 is pulled in an opposite direction (F'), the stroller frame 1 can be easily converted from the folded state to the unfolded state.

In summary, by virtue of the first and second four-bar linkage mechanisms, the stroller frame 1 is easily and smoothly operable between the folded state and the unfolded state by moving the handle grip 111 to drive multiple pivot mechanisms. The stroller frame 1 managed to become compact in the folded state as well.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

What is claimed is:

1. A stroller frame comprising two side frame units that are symmetrically arranged, each of said side frame units including:
    a handle rod;
    a front leg that includes a first front leg rod connected pivotally to an end of said handle rod, and a second front leg rod that is connected pivotally to said first front leg rod and that is adapted to be connected fixedly to a seat member;
    a rear leg rod that is connected pivotally to said handle rod; and
    a support rod that has an end connected pivotally to said rear leg rod, and an opposite end adapted to be connected pivotally to the seat member, said support rod being connected indirectly and pivotally to said second front leg rod,
    wherein each of said side frame units further includes a securing member that is adapted to be connected fixedly to a bottom of the seat member, and that has an end secured to said second front leg rod, and an opposite end connected pivotally to said support rod.

2. The stroller frame as claimed in claim 1, wherein:
    each of said side frame units further includes a side rod that has an end connected pivotally to said front leg, and an opposite end connected pivotally to said rear leg rod; and
    a pivot intersection of said end of said side rod and said front leg is adapted to be higher than the seat member.

3. The stroller frame as claimed in claim 2, wherein:
    for each of said side frame units, said handle rod, said first front leg rod, said side rod, and said rear leg rod cooperatively form a first four-bar linkage mechanism;
    for each of said side frame units, said first front leg rod, said second front leg rod, said support rod, and said side rod cooperatively form a second four-bar linkage mechanism; and
    said stroller frame being operable by virtue of said first and second four-bar linkage mechanisms between a folded state and an unfolded state.

4. The stroller frame as claimed in claim 2, wherein, for each of said side frame units, said rear leg rod, said opposite end of said side rod, and said end of said support rod interconnect with one another at a single intersection.

5. The stroller frame as claimed in claim 2, wherein:
    for each of said side frame units, said handle rod and said rear leg rod interconnect with each other at a first pivot intersection, said front leg and said lower end of said handle rod interconnect with each other at a second pivot intersection, said end of said side rod and said first front leg rod interconnect with each other at a third pivot intersection, and said opposite end of said side rod and said rear leg rod interconnect with each other at a fourth pivot intersection; and
    for each of said side frame units, said handle rod, said first front leg rod, said side rod, and said rear leg rod cooperatively form a first four-bar linkage mechanism having said first, second, third and fourth pivot intersections.

6. The stroller frame as claimed in claim 5, wherein:
    for each of said side frame units, said end of said support rod and said rear leg rod interconnect with each other at the fourth pivot intersection, said opposite end of said support rod is adapted to be connected pivotally to the seat member at a fifth pivot intersection, and said first and second leg rods interconnect with each other at a sixth pivot intersection; and
    for each of said side frame units, said first front leg rod, said second front leg rod, said support rod, and said side rod cooperatively form a second four-bar linkage mechanism having the third, fourth, fifth and sixth pivot intersections.

7. The stroller frame as claimed in claim 1, further comprising a lock mechanism adapted to be connected between said opposite end of said support rod of one of said side frame units and the seat member.

8. The stroller frame as claimed in claim 1, wherein distal ends of said handle rods of said side frame units which are opposite to said front legs of said side frame units are connected to each other.

9. The stroller frame as claimed in claim 1, wherein lower ends of said second front leg rods of said side frame units are connected to each other, said second front leg rods of said side frame units being adapted for cooperatively supporting a footrest thereon.

10. A stroller frame comprising two side frame units that are symmetrically arranged, each of said side frame units including:
    a handle rod;
    a front leg that includes a first front leg rod connected pivotally to an end of said handle rod, and a second front leg rod that is connected pivotally to said first front leg rod and that is adapted to be connected fixedly to a seat member;
    a rear leg rod that is connected pivotally to said handle rod; and
    a support rod that has an end connected pivotally to said rear leg rod, and an opposite end adapted to be connected pivotally to the seat member, said support rod being connected indirectly and pivotally to said second front leg rod,
    wherein:
    each of said side frame units further includes a side rod that has an end connected pivotally to said front leg, and an opposite end connected pivotally to said rear leg rod; and
    a pivot intersection of said end of said side rod and said front leg is adapted to be higher than the seat member, and
    wherein, for each of said side frame units, said rear leg rod, said opposite end of said side rod, and said end of said support rod interconnect with one another at a single intersection.

11. A stroller frame comprising two side frame units that are symmetrically arranged, each of said side frame units including:
    a handle rod;
    a front leg that includes a first front leg rod connected pivotally to an end of said handle rod, and a second front leg rod that is connected pivotally to said first front leg rod and that is adapted to be connected fixedly to a seat member;
    a rear leg rod that is connected pivotally to said handle rod; and
    a support rod that has an end connected pivotally to said rear leg rod, and an opposite end adapted to be connected pivotally to the seat member, said support rod being connected indirectly and pivotally to said second front leg rod, wherein:

each of said side frame units further includes a side rod that has an end connected pivotally to said front leg, and an opposite end connected pivotally to said rear leg rod; and a pivot intersection of said end of said side rod and said front leg is adapted to be higher than the seat member, and wherein:

for each of said side frame units, said handle rod and said rear leg rod interconnect with each other at a first pivot intersection, said front leg and said lower end of said handle rod interconnect with each other at a second pivot intersection, said end of said side rod and said first front leg rod interconnect with each other at a third pivot intersection, and said opposite end of said side rod and said rear leg rod interconnect with each other at a fourth pivot intersection; and for each of said side frame units, said handle rod, said first front leg rod, said side rod, and said rear leg rod cooperatively form a first four-bar linkage mechanism having said first, second, third and fourth pivot intersections.

12. The stroller frame as claimed in claim 11, wherein:

for each of said side frame units, said end of said support rod and said rear leg rod interconnect with each other at the fourth pivot intersection, said opposite end of said support rod is adapted to be connected pivotally to the seat member at a fifth pivot intersection, and said first and second leg rods interconnect with each other at a sixth pivot intersection; and for each of said side frame units, said first front leg rod, said second front leg rod, said support rod, and said side rod cooperatively form a second four-bar linkage mechanism having the third, fourth, fifth and sixth pivot intersections.

* * * * *